United States Patent [19]
Lee et al.

[11] Patent Number: 5,612,744
[45] Date of Patent: Mar. 18, 1997

[54] IMAGE SIGNAL TRANSMITTING SYSTEM USING IMAGE FRAMES DIFFERENCES

[75] Inventors: Sang M. Lee; Joo H. Jeong; Chie T. Ahn, all of Yuseong-ku, Rep. of Korea

[73] Assignee: Electronics and Telecommunications Research Institute, Seoul, Rep. of Korea

[21] Appl. No.: 365,246

[22] Filed: Dec. 28, 1994

[30] Foreign Application Priority Data

Dec. 29, 1993 [KR] Rep. of Korea ............... 1993-30907

[51] Int. Cl.⁶ .................................................. H04N 7/32
[52] U.S. Cl. ........................................ 348/416; 348/699
[58] Field of Search ........................... 348/384, 390, 348/26, 400–403, 405, 407, 409–413, 416, 699; 382/166, 190, 195, 199, 232, 236, 238, 244–251, 254, 266; H04N 7/130, 7/137

[56] References Cited

U.S. PATENT DOCUMENTS

| | | | |
|---|---|---|---|
| 5,161,205 | 11/1992 | Moran et al. | 382/238 |
| 5,193,001 | 3/1993 | Kerdranvrat . | |
| 5,200,820 | 4/1993 | Gharavi . | |
| 5,204,920 | 4/1993 | Moran et al. . | |
| 5,237,410 | 8/1993 | Inoue | 348/409 |
| 5,251,028 | 10/1993 | Iu | 348/400 |
| 5,295,201 | 3/1994 | Yokohama | 382/238 |
| 5,347,311 | 9/1994 | Golin | 348/416 |
| 5,420,638 | 5/1995 | Riglet et al. | 348/409 |
| 5,459,513 | 10/1995 | Oddou | 382/199 |
| 5,467,413 | 11/1995 | Barrett | 348/405 |

OTHER PUBLICATIONS

M.J. Biggar, "Segmented Video Coding", *IEEE, Acoustics, Speech, and Signal Processing Society*, 1988, pp. 1108–1111.

M. Soryani et al., "Coding Moving Image Sequences by Segmentation of Difference Frames . . . ", *Electronics Letters*, Jun. 8, 1989, vol. 25, No. 12, pp. 794–795.

Primary Examiner—Tommy P. Chin
Assistant Examiner—Richard Lee
Attorney, Agent, or Firm—Spencer & Frank

[57] ABSTRACT

An image signal transmitting system uses the difference between image frames, which can transmit lots of information in a small amount of data, by transmitting the acutal moving areas which are extracted by using two change detecting masks and whose contours and textures are encoded for human visual perception. A larger amount of information is expresssed by a smaller amount of data by extracting the motion in a unit of frames, not in a unit of blocks, and expressing a converted portion by its contour and texture to facilitate the recognition of the converted portion.

2 Claims, 4 Drawing Sheets

+

=

5,612,744

IMAGE SIGNAL TRANSMITTING SYSTEM USING IMAGE FRAMES DIFFERENCES

BACKGROUND OF THE INVENTION

1. Field of the Invention

The present invention relates to an image signal transmitting system using the difference between image frames, which can transmit lots of information in a small amount of data by transmitting the actual moving areas which are extracted by using two change detecting masks and then whose contours and textures are encoded for human visual perception.

2. Description of the Prior Art

Generally speaking, since video has a lot of correlation along the time axis, an original image can be made by using only differences between frames, that is, a current frame can be produced by adding the difference information to a previous frame. Accordingly, a current frame can be produced from a small amount of the data transmitted by transmitting the frame differences which are the information of the differences between frames rather than by transmitting a full frame. When this characteristic is used, it is also possible to transmit a vast amount of information through a transmission channel having a small capacity.

Research for extracting the motion vectors of an object, whose size is fixed, has been carried out to utilize the correlation between image frames. But the following problems have been exposed A moving object has to always have a rigid body and a constant size. If there exist picture elements (pels) moving in different directions within the object, separate motion vectors must be extracted, since it would be considered as a different object. If the profile of the object is changed by rotation, it is then recognized as an absolutely different object.

In the meantime, research is being carried out for transmitting image signals by obtaining the differences between frames with an interest in the motion of each block after dividing a frame into blocks with a constant size, as shown in FIG. 1.

FIG. 1 shows a configuration of a conventional image signal transmitting system. A motion vector is extracted through a motion estimator 2 for estimating how much each of the blocks of a frame has moved, by using an original image of the current frame inputted from outside and an original image of the previous frame stored in a frame memory 1. A frame storing and predicting part 3 predicts the current image by compensating for motion of a reproduced image of the previous frame by using said reproduced image of the previous frame stored in its internal frame memory and the motion vectors of the motion estimator 2.

The predicted error, which is the difference between the original image of the current frame inputted and the image predicted by the frame storing and predicting part 3, is obtained by an adder 4, processed for a discrete cosine transform by a discrete cosine transformer 5, quantized by a quantizer 6 and transmitted to a variable length encoder 7.

The predicted error signal outputted from the variable length encoder 7 and the motion vector outputted from the motion estimator 2 are transmitted through a multiplexer 8 to a buffer 9. The buffer controls the rate of the data going out to a transmission channel.

In the case of the occurrence of more data than the capacity of the transmission channel, the status of the buffer is transmitted to a rate controller 10, which controls the quantizer 6 to adjust quantizing steps.

To obtain the reproduced image of the previous frame to be used for predicting the current frame, the quantized results of the quantizer 6 are transmitted through an inverse quantizer 27 and inverse discrete cosine transformer 28 and added to the reproduced image of the frame stored prior to the next previous image.

A conventional image signal transmitting system has the problem that it estimates motions in a unit of blocks and therefore can not estimate correctly the motion if other different motions exist within a block. A second problem is that the predicted errors consequently become bigger at the adder 4 and the number of bits being variable length encoded is increased. A third problem is that it is not proper to use the discrete cosine transform because the human eyes cannot be expressed perfectly in a mathematical manner.

SUMMARY OF THE INVENTION

To provide an image signal transmitting system using image frame differences, which can store a larger amount of information with a smaller amount of data by extracting motions in a unit of frames, not in a unit of blocks, and by expressing the converted portion by contour and texture by utilizing the characteristics that human eyes are sensitive to the contours of an object, the present invention, in a video transmitting circuit using the difference between image frames, comprises: synthesizing means for synthesizing an original image input signal and a first change detecting mask signal and having an output for extracting a changed portion of a current frame; initial segmenting means connected to the output of said synthesizing means for segmenting the changed portion of the current frame; motion detecting means having inputs for receiving the output of said initial segmenting means and a second change detecting mask signal for detecting a moved portion in the output of the initial segmenting means; final segmenting means having an input for receiving the output of said motion detecting means for extracting simplified areas; texture encoding means having an input for receiving the output of said final segmenting means and the original input signal for expressing texture information; contour encoding means having an input for receiving the output of said final segmenting means for expressing contour information; buffer means having inputs for receiving the output of said texture encoding means and the output of said contour encoding means, for transmitting signals to a transmission channel and delivering its status information to said motion detecting means for adjusting an amount of data occuring in consideration of the capacity of the transmission channel; frame reproducing means having an input for receiving the output of said buffer means; for reproducing an image of the previous frame; postprocess filtering means having an input for receiving the output of said frame reproducing means, for smoothing out properties between regions texture encoding reproduced in said frame reproducing means; first frame memory means having an input for receiving output of said postprocess filtering means, for storing the reproduced frame; preprocess filtering means for filtering the original image input signal and eliminating granular noises; first adder means having inputs for receiving the output of said preprocess filtering means and the output of said first frame memory, for obtaining the difference between the reproduced images of the previous frame and the preprocessed images of the current frame first change detecting means which receives and sets a threshold value for the output of said first adder means to generate the first change detecting mask signal; second frame memory means for receiving and storing the output of said preprocess filtering means; second adder means having inputs for receiving the output of said preprocess filtering means and the output of said second frame memory means, for obtaining the difference between the original image of the current frame and the original image of the previous frame; and second change detecting means which receives and sets a threshold value for the output of said second adder means to generate the second change detecting mask signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
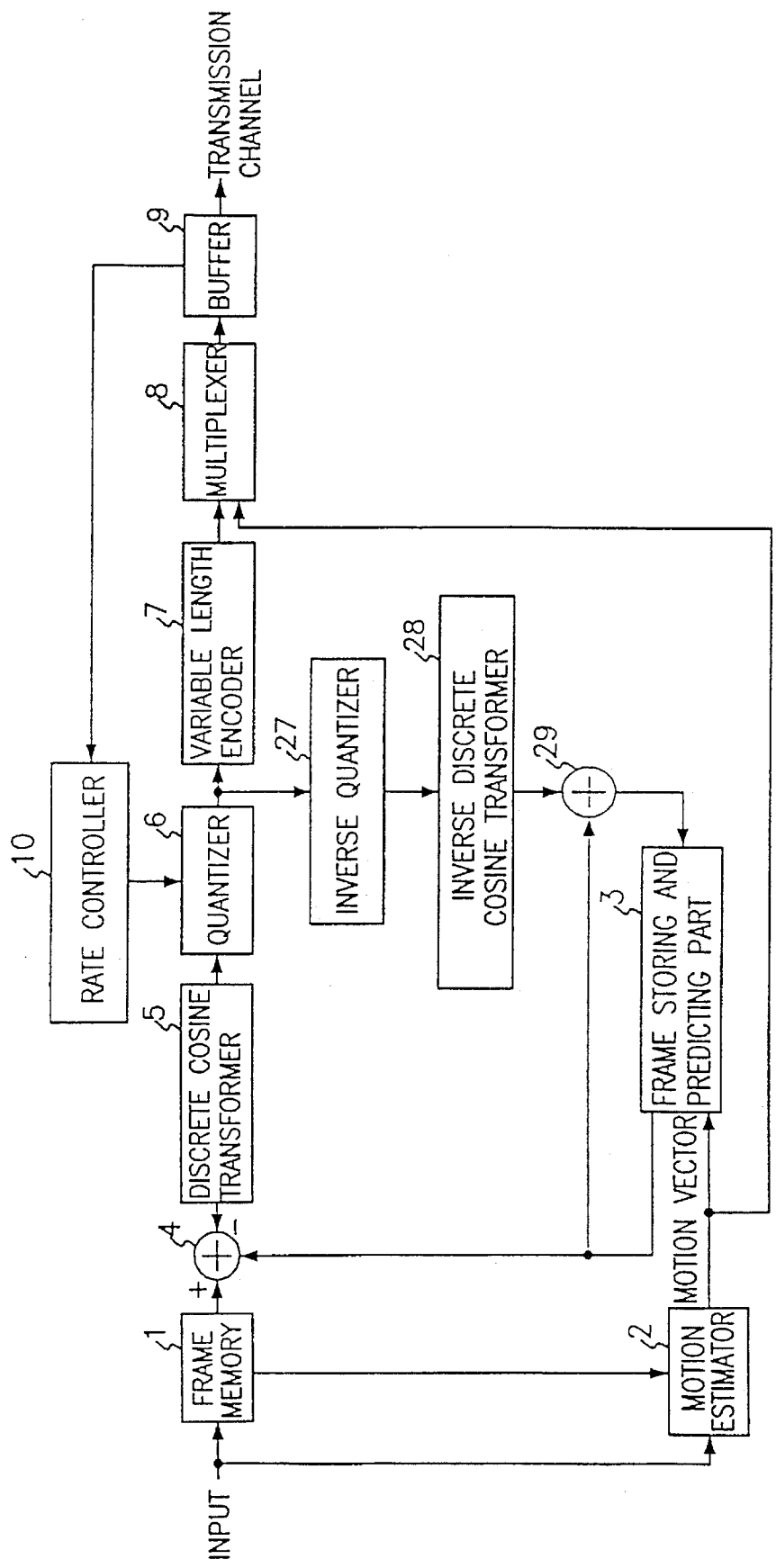
FIG. 1 shows a configurational block diagram of a conventional image signal transmitting system.
Figure 2:
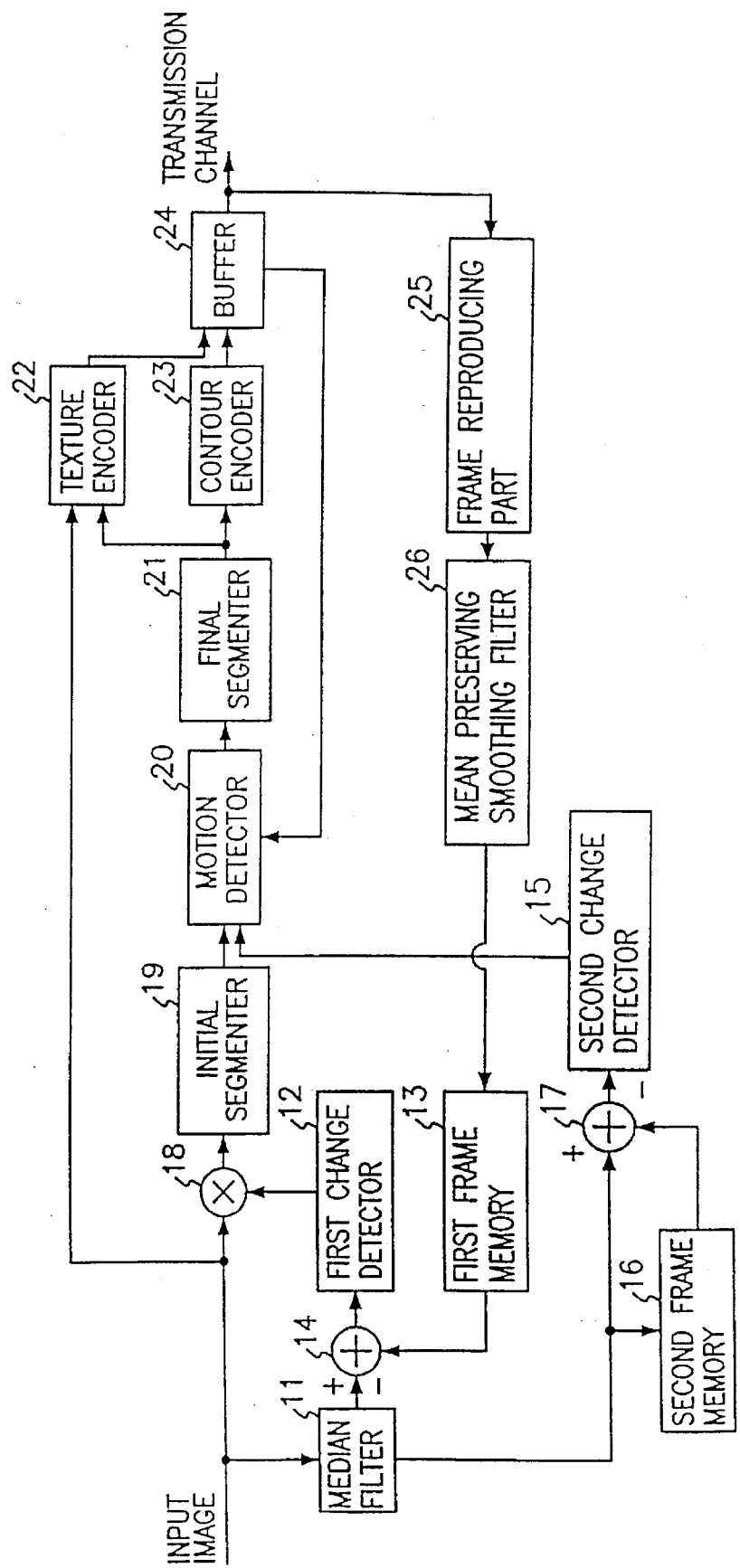
FIG. 2 is a block diagram showing a configuration of an image signal transmission system according to the present invention.

FIG. 2 shows a configuration of an image signal transmission system using image frame differences according to the present invention. An inputted image is preprocessed through a median filter 11 and granular noises are eliminated. A first adder 14 obtains the difference between the original image of the reproduced previous frame outputted from a first frame memory 13 and that of the current frame preprocessed. A first change detector 12 sets a threshold for the output of the first adder 14 and obtains the first change detecting mask.

A second adder 17 obtains the difference between the original image of the reproduced previous frame outputted from the second frame memory 16 and that of the current frame preprocessed. A second change detector 15 sets a threshold for the output of the second adder 17 and obtains the second change detecting mask. A synthesizer 18 selects only the portion corresponding to the first change detecting mask from the original image of the current frame. The changed portion of the current frame extracted from said synthesizer 18 is segmented at the an initial segmenter 19. The initial segmenter 19 extracts contours by an object contour tracing method for tracing the contour portion of an object, which is sensitive to human eyes, in other words, searches out the contour between the regions contoured together by similar pels.

Figure 3C:
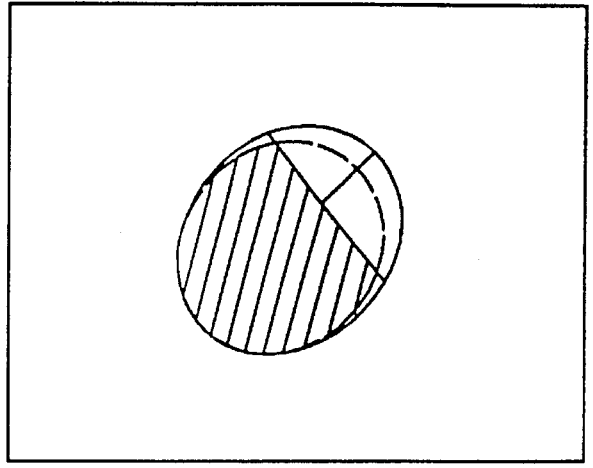
FIGS. 3A–3C illustrate two change detecting masks and the image frame difference segmented finally according to the present invention.
Figure 3B:
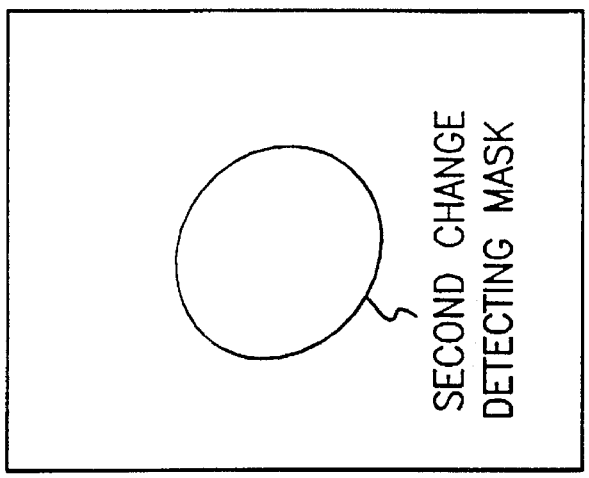
Figure 3A:
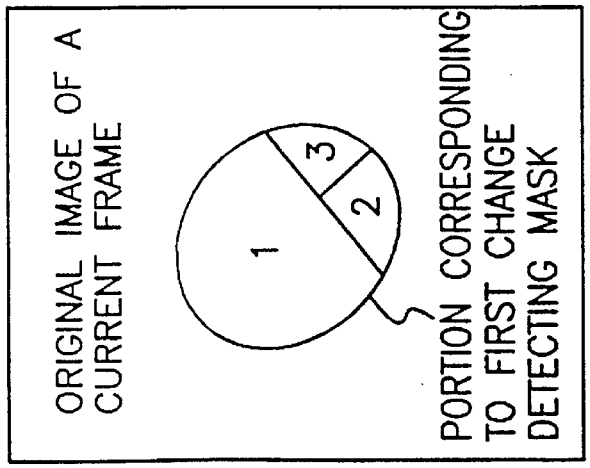

A motion detector 20 overlaps the original image of the current frame segmented initially and the second detecting mask, and considers as the portion really moved and selects the portion of the initially segmented regions, which has a bigger rate of being overlapped with the second change detecting mask. FIG. 3A shows an original image of the current frame segmented initially, FIG. 3B the second detecting mask and FIG. 3C shows the case where FIG. 3A and FIG. 3b are overlapped together. Here, the region 1 is selected.

The result which went through the initial segmenter 19 and a motion detector 20 as mentioned above, is inputted to the final segmenter 21, which adds the regions that have similar properties and are divided in more detail than necessary and extracts the region simplified on the whole.

The final region simplified at the final segmenter 21 is finally expressed by the contour information of the region and the information on the texture, which is the properties of the inside of the region. Accordingly the final region goes through a contour encoder 23 for expressing the contour information and a texture encoder for expressing the texture information and then is stored temporarily in a buffer 24 before being transmitted to a transmission channel. The buffer sends its status information to a motion detector 20 to adjust the amount of the data occurring in consideration of the capacity of the transmission capacity. The motion detector 20 adjust the overlapping rate according to the status information of the buffer.

In the meantime, a frame reproducer 25 reproduces the images transmitted to the transmission channel for a reproduction image of the previous frame used at the first change detector 12. In other words, the frame reproducer 25 reproduces a desired image by adding the result of the contour encoder 23 and that of the texture encoder 22 to the previous frame and performs the postprocessing of the image through a mean preserving smoothing filter 26 to smooth out the properties between the regions expressed in the texture encoder 22. The mean preserving smoothing filter 26, a postprocess filter, maintains the average of the inside of the region and smoothes out the contour of the region to eliminate an offending of human eyes.

Figure 4C:
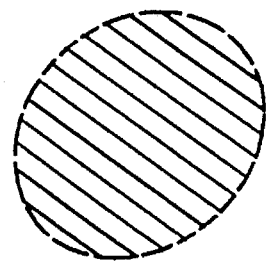
FIGS. 4A–4C illustrate the contour-texture encoding according to the present invention.
Figure 4B:
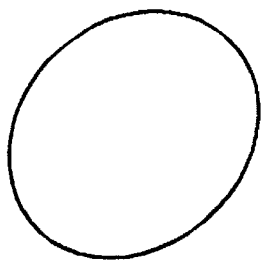
Figure 4A:
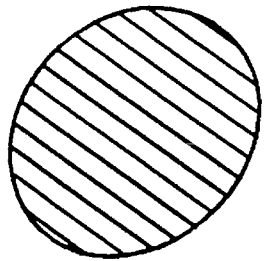

The contour encoding and texture encoding are expressed and illustrated in the FIG. 4A of the final segmented region, FIG. 4B of the contour portion, and FIG. 4C of the texture portion expressing the property of the region.

As mentioned above, the present invention has excellent advantages in that a larger amount of information can be expressed by a smaller amount of data by extracting the motion in a unit of frames, not in a unit of blocks, and expressing a converted portion by its contour and texture to facilitate the recognition of the converted portion.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An image signal transmitting system using image frame differences, in a video transmitting circuit using the difference between image frames, comprising:

synthesizing means for synthesizing an original image input signal and a first change detecting mask signal, and having an output for extracting a changed portion of a current frame;

initial segmenting means connected to the output of said synthesizing means for segmenting the changed portion of the current frame;

motion detecting means having inputs for receiving the output of said initial segmenting means and a second change detecting mask signal for detecting a moved portion in the output of the initial segmenting means;

final segment means having an input for receiving the output of said motion detecting means for extracting simplified areas;

texture encoding means having an input for receiving the output of said final segmenting means and the original image input signal for expressing texture information;

contour encoding means having an input for receiving the output of said final segmenting means for expressing contour information;

buffer means having inputs for receiving the output of said texture encoding means and the output of said contour encoding means for transmitting signals to a transmission channel and delivering its status information to said motion detecting means for adjusting an amount of data occurring in consideration of the capacity of the transmission channel;

frame reproducing means having an input for receiving the output of said buffer means for reproducing an image of the previous frame;

postprocess filtering means having an input for receiving the output of said frame reproducing means for smoothing out properties between regions reproduced in said frame reproducing means;

first frame memory means having an input for receiving the output of said postprocess filtering means for storing the reproduced frame;

preprocess filtering means for filtering the original image input signal and eliminating granular noises;

first adder means having inputs for receiving the output of said preprocess filtering means and the output of said first frame memory for obtaining the difference between the reproduced images of the previous frame and the preprocessed images of the current frame;

first change detecting means which receives and sets a threshold value for the output of said first adder means to generate the first change detecting mask signal;

second frame memory means for receiving and storing the output of said preprocess filtering means;

second adder means having inputs for receiving the output of said preprocess filtering means and the output of said second frame memory means for obtaining the difference between the original image of the current frame and the original image of the previous frame; and second change detecting means which receives and sets a threshold value for the output of said second adder means to generate the second change detecting mask signal.

2. An image signal transmitting system using image frame differences in accordance with claim 1, wherein said postprocess filtering means comprises a mean preserving smoothing filter.

* * * * *

UNITED STATES PATENT AND TRADEMARK OFFICE
CERTIFICATE OF CORRECTION

PATENT NO : 5,612,744
DATED : March 18, 1997
INVENTOR(S): S. M. LEE et al.

It is certified that error appears in the above-identified patent and that said Letters Patent are hereby corrected as shown below:

On the title page, change line [73], to read --ELECTRONICS & TELECOMMUNICATIONS RESEARCH INSTITUTE, Daejeon, Rep. of Korea and KOREA TELECOMMUNICATION AUTHORITY, Seoul, Rep. of Korea--

Signed and Sealed this

Tenth Day of April, 2001

*Attest:*

NICHOLAS P. GODICI

*Attesting Officer*  Acting Director of the United States Patent and Trademark Office